US008927926B2

(12) United States Patent
Shimada et al.

(10) Patent No.: US 8,927,926 B2
(45) Date of Patent: Jan. 6, 2015

(54) MASS SPECTROMETRY METHOD, ION PRODUCTION DEVICE, AND MASS SPECTROMETRY SYSTEM

(75) Inventors: Haruo Shimada, Kanagawa (JP); Yoshimasa Nakatani, Kanagawa (JP); Yuka Noritake, Kanagawa (JP); Kazumasa Kinoshita, Kanagawa (JP); Yasuo Shida, Tokyo (JP)

(73) Assignees: Shiseido Company, Ltd., Tokyo (JP); Bio Chromato, Inc., Kanagawa (JP)

( * ) Notice: Subject to any disclaimer, the term of this patent is extended or adjusted under 35 U.S.C. 154(b) by 0 days.

(21) Appl. No.: 13/997,707

(22) PCT Filed: Dec. 26, 2011

(86) PCT No.: PCT/JP2011/080025
§ 371 (c)(1), (2), (4) Date: Jun. 25, 2013

(87) PCT Pub. No.: WO2012/090915
PCT Pub. Date: Jul. 5, 2012

(65) Prior Publication Data
US 2013/0299692 A1 Nov. 14, 2013

(30) Foreign Application Priority Data
Dec. 27, 2010 (JP) ................................. 2010-290744

(51) Int. Cl.
*B01D 59/44* (2006.01)
*H01J 49/00* (2006.01)
*H01J 49/10* (2006.01)
*H01J 49/04* (2006.01)
*H01J 49/14* (2006.01)

(52) U.S. Cl.
CPC ............. *H01J 49/10* (2013.01); *H01J 49/0404* (2013.01); *H01J 49/049* (2013.01); *H01J 49/14* (2013.01); *H01J 49/0027* (2013.01)
USPC ........... 250/282; 250/281; 250/283; 250/287; 250/288; 250/289; 250/290; 250/291; 250/292; 250/423 R

(58) Field of Classification Search
USPC ...................... 250/281–283, 287–292, 423 R
See application file for complete search history.

(56) References Cited

U.S. PATENT DOCUMENTS

| | | | | |
|---|---|---|---|---|
| 3,743,831 | A * | 7/1973 | Lempka | 250/425 |
| 2004/0226360 | A1 * | 11/2004 | Lotters | 73/204.27 |
| 2008/0073502 | A1 * | 3/2008 | Schneider et al. | 250/282 |
| 2013/0284915 | A1 * | 10/2013 | Shimada et al. | 250/282 |

FOREIGN PATENT DOCUMENTS

| | | |
|---|---|---|
| JP | 2007-256246 | 10/2007 |
| JP | 2008-180659 | 8/2008 |
| WO | WO 2009/114109 | 9/2009 |

OTHER PUBLICATIONS

International Search Report mailed on Feb. 14, 2012.

* cited by examiner

*Primary Examiner* — Jack Berman
*Assistant Examiner* — Meenakshi Sahu
(74) *Attorney, Agent, or Firm* — IPUSA, PLLC

(57) ABSTRACT

A mass spectrometry method of the present invention is such that a sample is heated to generate a gas and an ion that is produced from the gas is introduced into a mass spectrometer by using DART so that mass spectrometry is conducted.

4 Claims, 6 Drawing Sheets

MASS SPECTROMETRY METHOD, ION PRODUCTION DEVICE, AND MASS SPECTROMETRY SYSTEM

TECHNICAL FIELD

The present invention relates to a mass spectrometry method, an ion production device, and a mass spectrometry system.

BACKGROUND ART

While a variety of methods have been known as atmospheric pressure ionization methods, attention has been paid to DART (Direct Analysis in Real Time) recently (see Patent Document 1).

DART is a method for colliding an atom or molecule in an electronically excited state with water in atmosphere to cause penning ionization thereof and adding a produced proton to a sample to cause ionization thereof.

For example, when a helium in a metastable excited state He ($2^3S$) is used, it is possible to ionize a sample M as follows.

$$He(2^3S)+H_2O \rightarrow H_2O^{+*}+He(1^1S)+e^-$$

$$H_2O^{+*}+H_2O \rightarrow H_3O^{+}+OH^*$$

$$H_3O^{+}+nH_2O \rightarrow [(H_2O)_nH]^+$$

$$[(H_2O)_nH]^+ + M \rightarrow MH^+ + nH_2O$$

However, there is a problem in that it is difficult to analyze a polymer compound.

PRIOR ART DOCUMENTS

Patent Documents

Patent Document 1: Japanese Patent Application Publication No. 2008-180659

SUMMARY OF THE INVENTION

Problems to be Solved by the Invention

While a problem that is possessed by a conventional technique as described above is taken into consideration, the present invention aims to provide a mass spectrometry method and mass spectrometry system that are capable of analyzing a polymer compound and an ion production device that is used in the mass spectrometry method and mass spectrometry system.

Means for Solving the Problem

A mass spectrometry method of the present invention is such that a sample is heated to generate a gas and an ion that is produced from the gas is introduced into a mass spectrometer by using DART so that mass spectrometry is conducted.

A mass spectrometry method of the present invention is such that a sample is heated and an ion that is produced from the sample is introduced into a mass spectrometer by using DART so that mass spectrometry is conducted.

An ion production device of the present invention is an ion production device for producing an ion from a gas that is generated by heating a sample, and has heating means for heating the sample to generate a gas and a DART ion source for producing an ion from the gas.

An ion production device of the present invention is an ion production device for producing an ion by heating a sample, and has heating means for heating the sample and a DART ion source for producing an ion from the sample.

A mass spectrometry system of the present invention has an ion production device of the present invention and a mass spectrometer.

Effects of the Invention

According to the present invention, it is possible to provide a mass spectrometry method and mass spectrometry system that are capable of analyzing a polymer compound and an ion production device that is used in the mass spectrometry method and mass spectrometry system.

EMBODIMENTS FOR IMPLEMENTING THE INVENTION

Next, an embodiment for implementing the present invention will be described in conjunction with the drawings.

Figure 1:
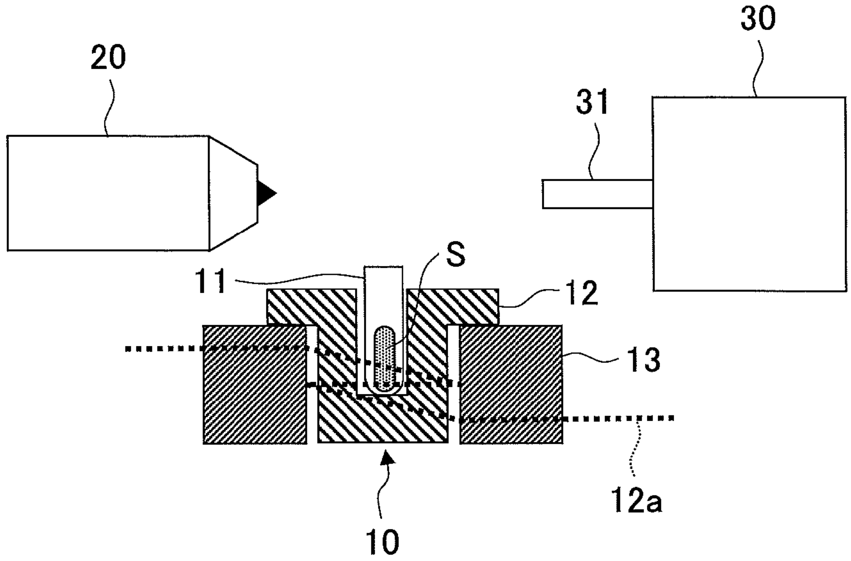
FIG. 1 is a schematic diagram that illustrates one example of a mass spectrometry method of the present invention.

FIG. 1 illustrates one example of a mass spectrometry method of the present invention. Additionally, only a heating device 10 is illustrated as a cross-sectional view in FIG. 1.

First, after a sample S is put into a pot 11, the pot 11 is held in a pot holding member 12. Herein, because the pot holding member 12 is wrapped with a resistance heating wire 12*a*, a voltage is applied to the resistance heating wire 12*a* by using an electric power supply (not-illustrated) so that it is possible to heat the pot holding member 12. Thereby, it is possible to heat the sample S to generate a gas. Furthermore, a heat insulation member 13 is placed around the pot holding member 12.

Then, while a helium in a metastable excited state He ($2^3S$) is collided with water in atmosphere to cause penning ionization thereof by using a DART ion source 20, a gas that is generated by heating the sample S is irradiated with a produced proton and a produced ion is introduced through an ion introduction tube 31 of a mass spectrometer 30 so that mass spectrometry is conducted. Herein, a pressure inside the ion introduction tube 31 is reduced by a compressor (not-illustrated).

Thereby, when the sample S includes a polymer compound, the polymer compound is pyrolyzed and an ion that is produced from a generated gas is introduced into the mass spectrometer 30, so that it is possible to analyze a structure of the polymer compound. Furthermore, a temperature for heating the sample S is changed continuously or stepwise, so that it is possible to introduce an ion that is produced from a gas that is generated by heating the sample S at each temperature into the mass spectrometer 20.

A temperature of the pot holding member 12 at a time when the sample S is heated is usually 50-1200° C., wherein 200-1000° C. is preferable. If a temperature of the pot holding member 12 is less than 50° C., it may be difficult to pyrolyze a polymer compound, and if one greater than 1200° C. is provided, the resistance heating wire 12*a* may be cut.

While a material for composing the pot 11 is not particularly limited as long as a heat-resisting property is possessed, it is possible to provide a glass, a quartz, or the like.

While a material for composing the pot holding member 12 is not particularly limited as long as a heat-resisting property is possessed, it is possible to provide a ceramic, a heat-resisting glass, a stainless steel, a niobium steel, a tantalum steel, or the like.

While a material for composing the resistance heating wire 12*a* is not particularly limited, it is possible to provide a metal heating element such as an iron-chromium-aluminum-based alloy or a nickel-chromium-based alloy; a refractory metal heating element such as a platinum, a molybdenum, a tantalum, or a tungsten; a non-metal heating element such as a silicon carbide, a molybdenum-silicite, or a carbon; or the like.

While a material for composing the heat insulation member 13 is not particularly limited as long as a heat-resisting property and a heat insulating property are possessed, it is possible to provide a ceramic, a glass, a stainless steel, a niobium steel, a tantalum steel, or the like.

While the sample S is not particularly limited as long as it is possible to produce an ion by using the DART ion source 20, it is possible to provide an organic compound, a polymer compound, or the like.

Figure 2:
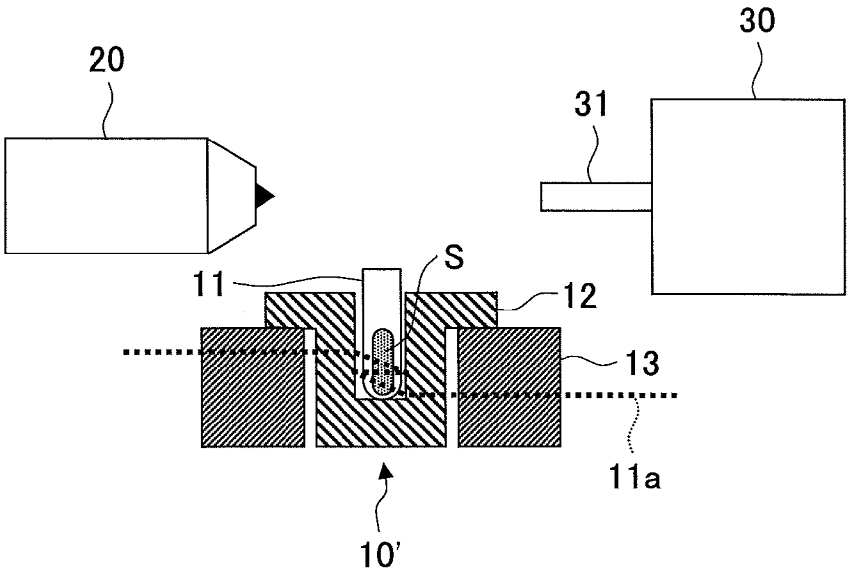
FIG. 2 is a schematic diagram that illustrates another example of a mass spectrometry method of the present invention.

Additionally, the pot 11 may be wrapped with a resistance heating wire 11*a* (see FIG. 2) instead of wrapping the pot holding member 12 with the resistance heating wire 12*a*. Additionally, only a heating device 10' is illustrated as a cross-sectional view in FIG. 2.

Furthermore, a heat source may be placed under the pot 11 without wrapping the pot holding member 12 with the resistance heating wire 12*a*.

While a heat source is not particularly limited, it is possible to provide a hot plate wherein a ceramic heater or a cartridge heater is embedded in a plate or the like.

While a material for composing a plate is not particularly limited as long as a heat conductance is favorable, it is possible to provide a copper, an aluminum, or the like.

Figure 3:
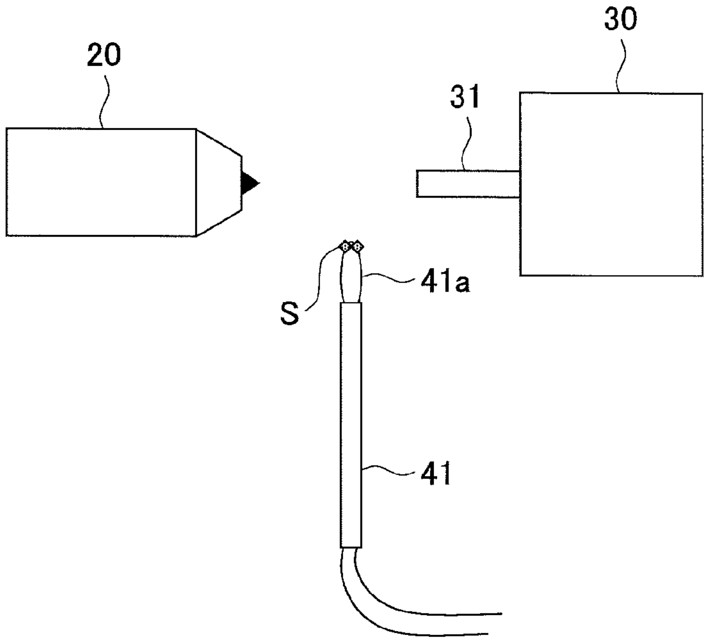
FIG. 3 is a schematic diagram that illustrates another example of a mass spectrometry method of the present invention.

FIG. 3 illustrates another example of a mass spectrometry method of the present invention.

First, after a sample S is attached to a resistance heating wire 41*a* that is supported by a resistance heating wire supporting member 41, a voltage is applied to the resistance heating wire 41*a* by using an electric power supply (not-illustrated) so that it is possible to heat the sample S to generate a gas.

Then, while a helium in a metastable excited state He ($2^3$S) is collided with water in atmosphere to cause penning ionization thereof by using a DART ion source 20, a gas that is generated by heating the sample S is irradiated with a produced proton and a produced ion is introduced through an ion introduction tube 31 of a mass spectrometer 30 so that mass spectrometry is conducted. Herein, a pressure inside the ion introduction tube 31 is reduced by a compressor (not-illustrated).

Thereby, when the sample S includes a polymer compound, the polymer compound is pyrolyzed and an ion that is produced from a generated gas is introduced into the mass spectrometer 30, so that it is possible to analyze a structure of the polymer compound. Furthermore, a temperature for heating the sample S is changed continuously or stepwise, so that it is possible to introduce an ion that is produced from a gas that is generated by heating the sample S at each temperature into the mass spectrometer 30.

A temperature of the resistance heating wire 41*a* at a time when the sample S is heated is usually 50-1200° C., wherein 200-1000° C. is preferable. If a temperature of the resistance heating wire 41*a* is less than 50° C., it may be difficult to pyrolyze a polymer compound, and if one greater than 1200° C. is provided, the resistance heating wire 41*a* may be cut.

While the resistance heating wire supporting member 41 is not particularly limited as long as a heat resisting property and an insulation property are possessed, it is possible to provide a ceramic, a glass, or the like.

While a material for composing the resistance heating wire 41*a* is not particularly limited, it is possible to provide a metal heating element such as an iron-chromium-aluminum-based alloy or a nickel-chromium-based alloy; a refractory metal heating element such as a platinum, a molybdenum, a tantalum, or a tungsten; a non-metal heating element such as a silicon carbide, a molybdenum-silicite, or a carbon; or the like.

A method for heating the sample S to generate a gas is not limited to a method that applies an electric current to a resistance heating wire to heat the sample S and generate a gas, and it is possible to provide a method that uses a ceramic fiber heater to heat the sample S and generate a gas, a method that irradiates the sample S with a microwave to be heated and generate a gas, a method that uses a hot air device to heat the sample S and generate a gas, or the like.

Figure 4:
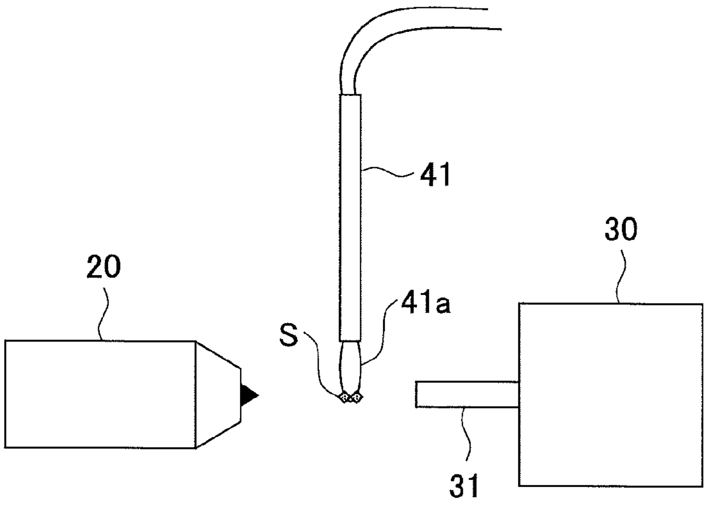
FIG. 4 is a schematic diagram that illustrates another example of a mass spectrometry method of the present invention.

FIG. 4 illustrates another example of a mass spectrometry method of the present invention.

After a sample S is attached to a resistance heating wire 41*a* that is supported by a resistance heating wire supporting member 41, a voltage is applied to the resistance heating wire 41*a* by using an electric power supply (not-illustrated) so that it is possible to heat the sample S. While the sample S is thus heated and a helium in a metastable excited state He ($2^3$S) is collided with water in atmosphere to cause penning ionization thereof by using a DART ion source 20, the sample S is irradiated with a produced proton and a produced ion is introduced through an ion introduction tube 31 of a mass spectrometer 30 so that mass spectrometry is conducted. Herein, a pressure inside the ion introduction tube 31 is reduced by a compressor (not-illustrated).

Thereby, when the sample S includes a polymer compound, the polymer compound is pyrolyzed and an ion that is produced from a generated gas is introduced into the mass spectrometer 30, so that it is possible to analyze a structure of the polymer compound.

A temperature of the resistance heating wire 41*a* at a time when the sample S is heated is usually 50-1200° C., wherein 200-1000° C. is preferable. If a temperature of the resistance heating wire 41*a* is less than 50° C., it may be difficult to pyrolyze a polymer compound, and if one greater than 1200° C. is provided, the resistance heating wire 41*a* may be cut.

A method for heating the sample S to generate a gas is not limited to a method that applies an electric current to a resistance heating wire to heat the sample S, and it is possible to provide a method that uses a ceramic fiber heater to heat the sample S, a method that irradiates the sample S with a microwave to be heated, a method that uses a hot air device to heat the sample S, or the like.

Additionally, a neon in a metastable excited state, an argon in a metastable excited state, a nitrogen in a metastable excited state, or the like may be used, instead of a helium in a metastable excited state He ($2^3S$).

PRACTICAL EXAMPLES

Practical Example 1

After a linear low-density polyethylene as a sample S was put into a pot 11 made of a heat-resisting glass, the pot 11 was held on a pot holding member 12.

Then, mass spectrometry of an ion that was produced from a gas that was generated by heating the linear low-density polyethylene was conducted by using the mass spectrometry method in FIG. 1. Specifically, first, while a helium in a metastable excited state He ($2^3S$) was collided with water in atmosphere to cause penning ionization thereof by using a DART ion source 20 and a gas that was generated by heating the linear low-density polyethylene was irradiated with a produced proton, a produced ion was introduced into a mass spectrometer 30 so that mass spectrometry was conducted. Herein, the pot holding member 12 was heated to 570° C. by applying an electric current of 4.5 A to a resistance heating wire 12*a*.

Additionally, DART SVP (produced by IonSense Inc.) was used as the DART ion source 20, wherein a temperature of a gas heater thereof was 300° C. Furthermore, MicrOTOFQII (produced by Bruker Daltonics K. K.) was used as the mass spectrometer 30, wherein a measurement mode was a positive ion mode. Furthermore, while a pot holding member 12 made of a ceramic was used and a nichrome wire with a diameter of 0.32 mm was used as the resistance heating wire 12*a*, a heat insulation member 13 made of a ceramic was used.

Figure 5:
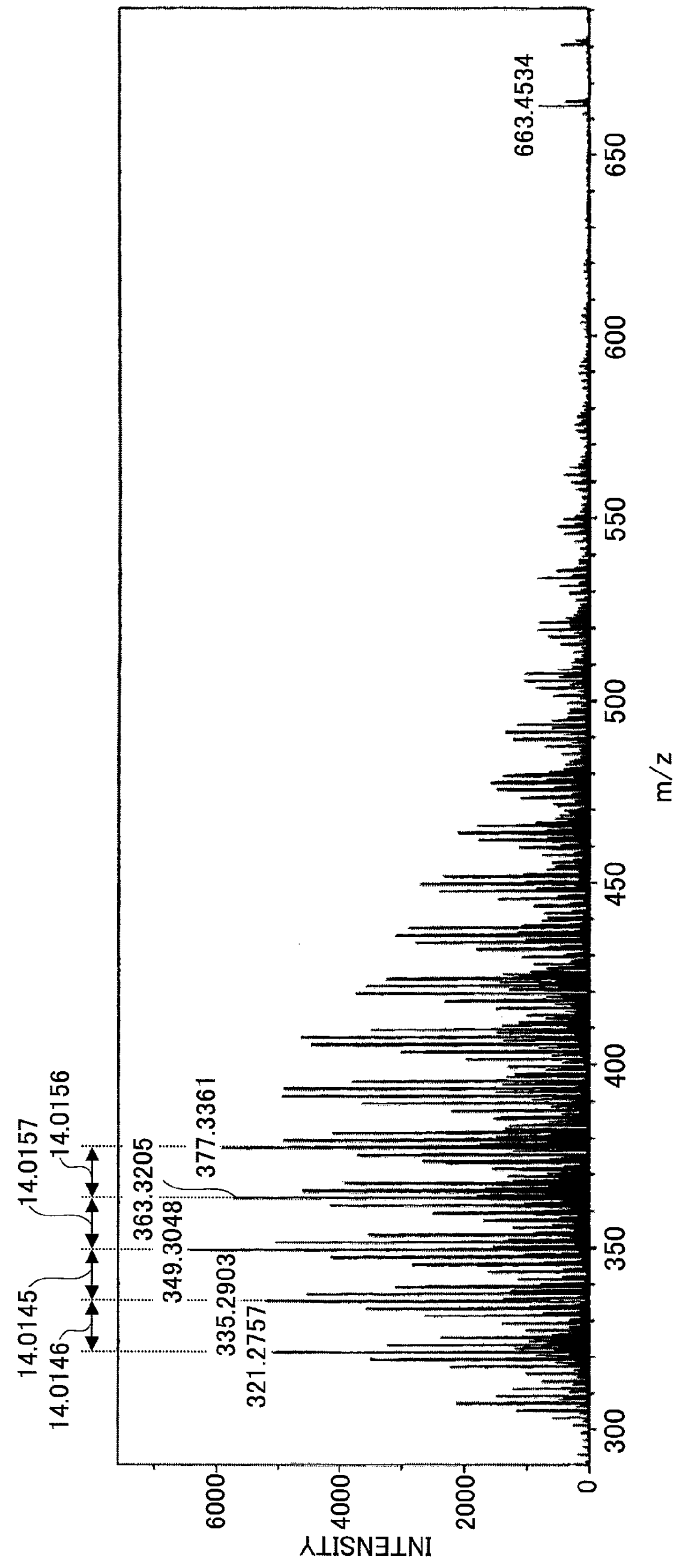
FIG. 5 is a mass spectrum of a linear low-density polyethylene in Practical Example 1.

FIG. 5 illustrates a mass spectrum of the linear low-density polyethylene. A pattern of pyrolyzed products of the linear low-density polyethylene wherein an m/z difference thereof was 14 was seen in FIG. 5. Accordingly, it was understood that it was possible to analyze a structure of the linear low-density polyethylene.

Practical Example 2

Mass spectrometry was conducted similarly to Practical Example 1 except that a polypropylene was used as a sample S.

Figure 6:
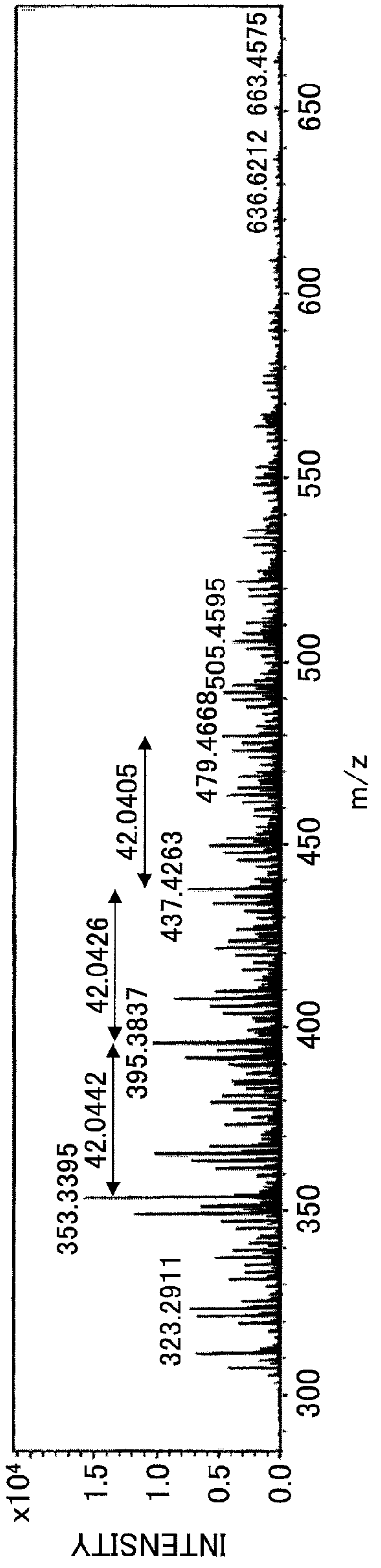
FIG. 6 is a mass spectrum of a polyethylene in Practical Example 2.

FIG. 6 illustrates a mass spectrum of the polypropylene. A pattern of pyrolyzed products of the polypropylene wherein an m/z difference thereof was 42 was seen in FIG. 6. Accordingly, it was understood that it was possible to analyze a structure of the polypropylene.

Practical Example 3

A resistance heating wire 41*a* was dipped in a 1 mg/mL solution of a polyethylene glycol with an average molecular weight of 1000 in methanol so that the polyethylene glycol was attached to the resistance heating wire 41*a* as a sample S.

Then, mass spectrometry of an ion that was produced from a gas that was generated by heating the polyethylene glycol was conducted by using the mass spectrometry method in FIG. 3. Specifically, first, while a helium in a metastable excited state He ($2^3S$) was collided with water in atmosphere to cause penning ionization thereof by using a DART ion source 20 and a gas that was generated by heating the polyethylene glycol was irradiated with a produced proton, a produced ion was introduced into a mass spectrometer 30 so that mass spectrometry was conducted. Herein, the polyethylene glycol resistance heating wire 41*a* was heated to 700° C. by applying an electric current of 4.5 A to a resistance heating wire 41*a*.

Additionally, DART SVP (produced by IonSense Inc.) was used as the DART ion source 20, wherein a temperature of a gas heater thereof was 200° C. Furthermore, MicrOTOFQII (produced by Bruker Daltonics K. K.) was used as the mass spectrometer 30, wherein a measurement mode was a positive ion mode. Furthermore, while a resistance heating wire supporting member 41 made of a ceramic was used and a nichrome wire with a diameter of 0.32 mm was used as the resistance heating wire 41*a*.

Figure 7:
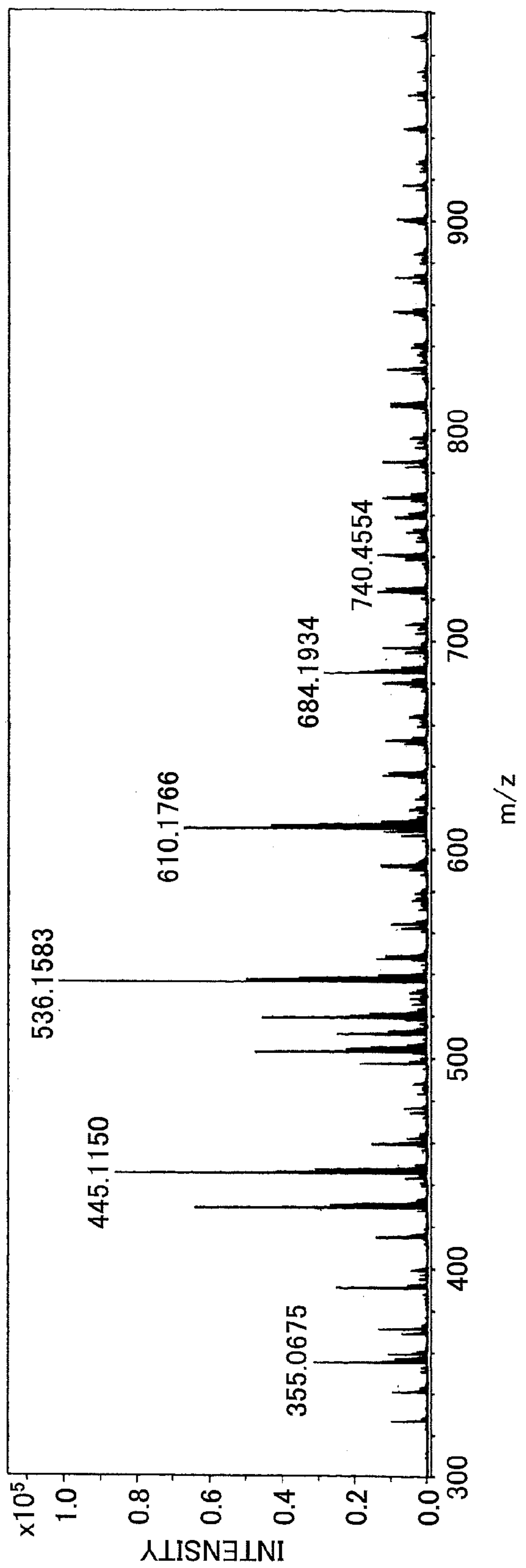
FIG. 7 is a mass spectrum of a polyethylene glycol in Practical Example 3.

FIG. 7 illustrates a mass spectrum of the polyethylene glycol. A pattern of the polyethylene glycol that was vaporized by heating and pyrolyzed products of the polyethylene glycol was seen in FIG. 7. Accordingly, it was understood that it was possible to analyze a structure of the polyethylene glycol.

Practical Example 4

A resistance heating wire 41*a* was dipped in a 1 mg/mL solution of a polyethylene glycol with an average molecular weight of 1000 in methanol so that the polyethylene glycol was attached to the resistance heating wire 41*a* as a sample S.

Then, mass spectrometry of an ion that was produced from a gas that was generated by heating the polyethylene glycol was conducted by using the mass spectrometry method in FIG. 4. Specifically, first, while the polyethylene glycol was heated and a helium in a metastable excited state He ($2^3S$) was collided with water in atmosphere to cause penning ionization thereof by using a DART ion source 20, a produced ion by irradiating the polyethylene glycol with a produced proton was introduced into a mass spectrometer 30 so that mass spectrometry was conducted. Herein, the resistance heating wire 41*a* was heated to 700° C. by applying an electric current of 4.5 A to a resistance heating wire 41*a*.

Additionally, DART SVP (produced by IonSense Inc.) was used as the DART ion source 20, wherein a temperature of a gas heater thereof was 200° C. Furthermore, MicrOTOFQII (produced by Bruker Daltonics K. K.) was used as the mass spectrometer 30, wherein a measurement mode was a positive ion mode. Furthermore, a resistance heating wire supporting member 41 made of a ceramic was used and a nichrome wire with a diameter of 0.26 mm was used as the resistance heating wire 41*a*.

Figure 8:
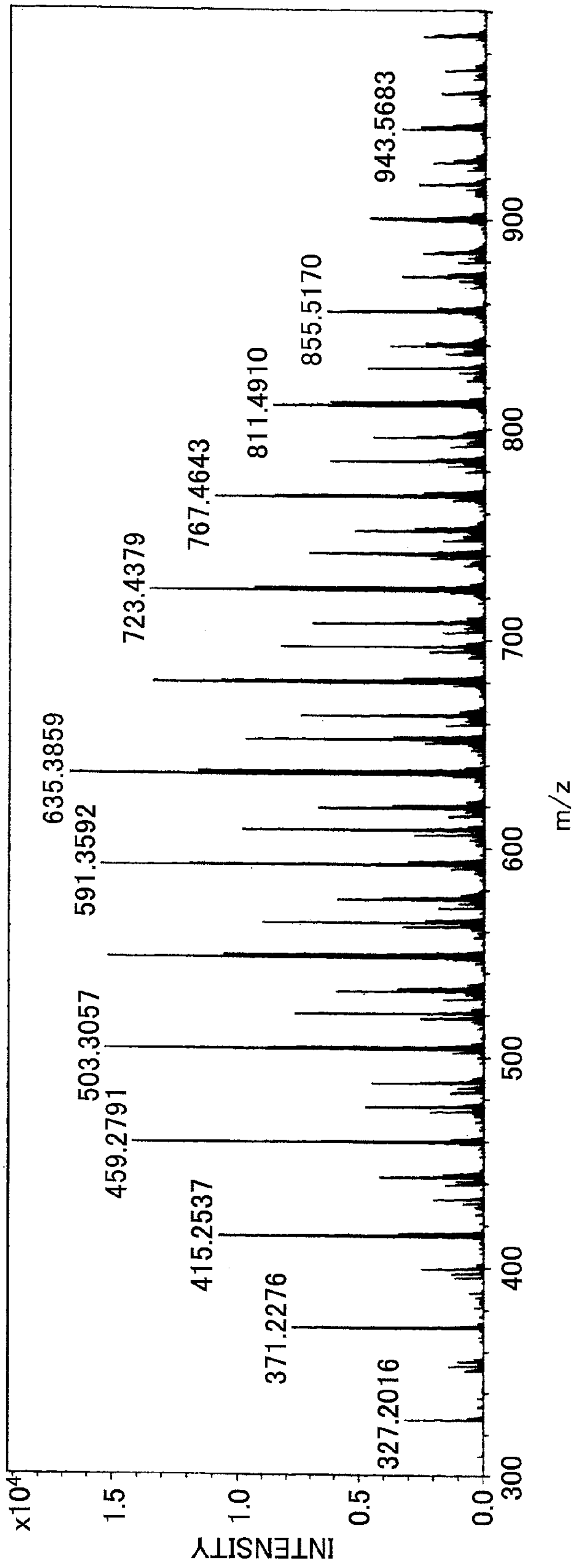
FIG. 8 is a mass spectrum of a polyethylene glycol in Practical Example 4.

FIG. 8 illustrates a mass spectrum of the polyethylene glycol. A pattern of the polyethylene glycol that was vaporized by heating and pyrolyzed products of the polyethylene glycol was seen in FIG. 8. Accordingly, it was understood that it was possible to analyze a structure of the polyethylene glycol.

APPENDIX

Embodiment (1)

A mass spectrometry method, characterized in that a sample is heated to generate a gas and an ion that is produced from the gas is introduced into a mass spectrometer by using DART so that mass spectrometry is conducted.

Embodiment (2)

The mass spectrometry method as described in Embodiment (1), characterized in that a voltage is applied to a resistance heating wire by using voltage applying means to heat the sample.

Embodiment (3)

The mass spectrometry method as described in Embodiment (2), characterized in that the sample is put into a pot that is wrapped with the resistance heating wire and a voltage is applied to the resistance heating wire by using the voltage applying means to heat the sample.

Embodiment (4)

The mass spectrometry method as described in Embodiment (2), characterized in that the sample is attached to the resistance heating wire and a voltage is applied to the resistance heating wire by using the voltage applying means to heat the sample.

Embodiment (5)

A mass spectrometry method, characterized in that a sample is heated and an ion that is produced from the sample is introduced into a mass spectrometer by using DART so that mass spectrometry is conducted.

Embodiment (6)

The mass spectrometry method as described in Embodiment (5), characterized in that the sample is attached to the resistance heating wire and a voltage is applied to the resistance heating wire by using the voltage applying means to heat the sample.

Embodiment (7)

An ion production device for producing an ion from a gas that is generated by heating a sample, characterized by having heating means for heating the sample to generate a gas and a DART ion source for producing an ion from the gas.

Embodiment (8)

The ion production device as described in Embodiment (7), characterized in that the heating means have a pot for putting the sample therein, the pot is wrapped with a resistance heating wire, and the heating means further have voltage applying means for applying a voltage to the resistance heating wire.

Embodiment (9)

The ion production device as described in Embodiment (7), characterized in that the heating means have a resistance heating wire for attaching the sample thereto and voltage applying means for applying a voltage to the resistance heating wire.

Embodiment (10)

An ion production device for producing an ion by heating a sample, characterized by having heating means for heating the sample and a DART ion source for producing an ion from the sample.

Embodiment (11)

The ion production device as described in Embodiment (10), characterized in that the heating means have a resistance heating wire for attaching the sample thereto and voltage applying means for applying a voltage to the resistance heating wire.

Embodiment (12)

A mass spectrometry system, characterized by having the ion production device as described in any one of Embodiments (7) to (11) and a mass spectrometer.

The present international application claims priority based on Japanese Patent Application No. 2010-290744 filed on Dec. 27, 2010, and the entire content of Japanese Patent Application No. 2010-290744 is incorporated by reference in the present international application.

EXPLANATION OF LETTERS OR NUMERALS

10, 10': heating device
11: pot
11*a*: resistance heating wire
12: pot holding member
12*a*: resistance heating wire
13: heat insulation member
20: DART ion source
30: mass spectrometer
31: ion introduction tube
41: resistance heating wire supporting member
41*a*: resistance heating wire
S: sample

The invention claimed is:

1. A mass spectrometry method, comprising:
heating a sample to generate a gas;
producing an ion from the gas by using DART; and
introducing the ion into a mass spectrometer,
wherein the heating of the sample includes applying a voltage to a resistance heating wire,
wherein the heating of the sample further includes attaching the sample to the resistance heating wire.

2. A mass spectrometry method, comprising:
heating a sample;
producing an ion from the sample by using DART; and
introducing the ion into a mass spectrometer,
wherein the heating of the sample includes attaching the sample to the resistance heating wire and applying a voltage to the resistance heating wire.

3. An ion production device, comprising:
a heating device configured to heat a sample to generate a gas; and
a DART ion source configured to produce an ion from the gas,
wherein the heating device includes a resistance heating wire configured to attach the sample thereto and a voltage applying device configured to apply a voltage to the resistance heating wire.

4. An ion production device, comprising:
a heating device configured to heat a sample; and
a DART ion source configured to produce an ion from the sample,
wherein the heating device includes a resistance heating wire configured to attach the sample thereto and a voltage applying device configured to apply a voltage to the resistance heating wire.

* * * * *